United States Patent
Ibaraki et al.

(10) Patent No.: US 12,081,877 B2
(45) Date of Patent: Sep. 3, 2024

(54) IMAGING CONTROL DEVICE, IMAGING CONTROL METHOD, AND NON-TRANSITORY COMPUTER READABLE RECORDING MEDIUM

(71) Applicant: JVCKENWOOD Corporation, Yokohama (JP)

(72) Inventors: Takeshi Ibaraki, Yokohama (JP); Norio Kurashige, Yokohama (JP); Nobuyuki Matsukawa, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 35 days.

(21) Appl. No.: 17/944,233

(22) Filed: Sep. 14, 2022

(65) Prior Publication Data

US 2023/0007187 A1 Jan. 5, 2023

Related U.S. Application Data

(63) Continuation of application No. PCT/JP2021/021514, filed on Jun. 7, 2021.

(30) Foreign Application Priority Data

Jul. 15, 2020 (JP) ................ 2020-121277

(51) Int. Cl.
*H04N 23/76* (2023.01)
*G06V 20/58* (2022.01)
(Continued)

(52) U.S. Cl.
CPC ........... *H04N 23/76* (2023.01); *G06V 20/584* (2022.01); *H04N 23/71* (2023.01); *H04N 23/741* (2023.01)

(58) Field of Classification Search
CPC ...... H04N 23/76; H04N 23/71; H04N 23/741; H04N 7/183; H04N 23/60; G06V 20/584
See application file for complete search history.

(56) References Cited

U.S. PATENT DOCUMENTS 10,600,165 B2   3/2020   Nashizawa

FOREIGN PATENT DOCUMENTS

| JP | 2019-071568 | 5/2019 |
| JP | 2019-101241 | 6/2019 |
| JP | 2019-193025 | 10/2019 |

OTHER PUBLICATIONS

JP 2019-193025 Translation (Year: 2019).*

(Continued)

*Primary Examiner* — Twyler L Haskins
*Assistant Examiner* — Angel L Garces-Rivera
(74) *Attorney, Agent, or Firm* — Amin, Turocy & Watson, LLP (57) ABSTRACT

Image quality is to be improved. An imaging control device includes: an imaging data obtaining unit that obtains imaging data; a frame setting unit that sets a predetermined frame in the imaging data obtained by the imaging data obtaining unit; a luminance value obtaining unit that obtains luminance values of imaging data in a range of the frame set by the frame setting unit; a representative value calculating unit that calculates a representative value from the luminance values obtained by the luminance value obtaining unit; and a converting unit that performs gamma conversion of the imaging data obtained by the imaging data obtaining unit.

5 Claims, 7 Drawing Sheets

(51) Int. Cl.
*H04N 23/71* (2023.01)
*H04N 23/741* (2023.01)

(56) References Cited

OTHER PUBLICATIONS

International Search Report and Written Opinion for International Application No. PCT/JP2021/021514 mailed on Aug. 24, 2021, 8 pages.
Extended European Search Report for European Patent Application No. 21842359.8 dated Sep. 14, 2023.

* cited by examiner

WHEN maxE = 12

FIG.8

WHEN maxE = 48

FIG.9

IMAGING CONTROL DEVICE, IMAGING CONTROL METHOD, AND NON-TRANSITORY COMPUTER READABLE RECORDING MEDIUM

CROSS-REFERENCE TO RELATED APPLICATION(S)

This application is a Continuation of PCT international application Ser. No. PCT/JP2021/021514 filed on Jun. 7, 2021 which designates the United States, incorporated herein by reference, and which claims the benefit of priority from Japanese Patent Application No. 2020-121277, filed on Jul. 15, 2020, incorporated herein by reference.

BACKGROUND

1. Technical Field

The present disclosure relates to an imaging control device, an imaging control method, and a non-transitory computer readable recording medium.

2. Description of the Related Art

In Japanese Unexamined Patent Application Publication No. 2019-071568, a technique, in which a second gradation conversion curve is generated and gradation conversion of image data is performed by use of the second gradation conversion curve, is described, the second gradation conversion curve resulting from adjustment of a first gradation conversion curve corresponding to a dynamic range of the image data, the adjustment being done so that luminance changes in a bright portion and a dark portion of the image data become visually equivalent to each other. In Japanese Unexamined Patent Application Publication No. 2019-101241, a signal conversion device having a converting unit and a calculating unit is described, the converting unit including a control function having hybrid log gamma characteristics, the calculating unit calculating a parameter value for adjusting a coefficient of a control function that converts an input signal of a bright area set beforehand.

High Dynamic Range (HDR) has less whiteouts, for example, and is thus higher in image quality than Standard Dynamic Range (SDR). There is a demand for even less whiteouts, for example, and thus even higher image quality for HDR of the hybrid log gamma type.

SUMMARY

To solve the above problem and achieve the object, an imaging control device according to the present disclosure, comprising: an imaging data obtaining unit that obtains imaging data; a frame setting unit that sets a predetermined frame on an image in the imaging data obtained by the imaging data obtaining unit; a luminance value obtaining unit that obtains luminance values of pixels included in imaging data that are in a range of the frame set by the frame setting unit; a representative value calculating unit that calculates a representative value from the luminance values obtained by the luminance value obtaining unit; and a converting unit that performs gamma conversion of the imaging data obtained by the imaging data obtaining unit, wherein the converting unit normalizes the imaging data by setting an upper limit value of luminance values on the basis of the representative value calculated by the representative value calculating unit and performs, by means of a hybrid log gamma transfer function according to the upper limit value of luminance values, the gamma conversion of the imaging data that have been normalized.

An imaging control method according to the present disclosure, including: an imaging data obtaining step of obtaining imaging data; a frame setting step of setting a predetermined frame on an image in the imaging data obtained by the imaging data obtaining step; a luminance value obtaining step of obtaining luminance values of pixels included in imaging data in a range of the frame set by the frame setting step; a representative value calculating step of calculating a representative value from the luminance values obtained by the luminance value obtaining step; and a converting step of performing gamma conversion of the imaging data obtained by the imaging data obtaining step, wherein the converting step includes: normalizing the imaging data by setting an upper limit value of luminance values on the basis of the representative value calculated by the representative value calculating step; and performing, by means of a hybrid log gamma transfer function, gamma conversion of the imaging data that have been normalized.

A non-transitory computer readable recording medium storing therein a program according to the present disclosure that causes a computer, which operates as an imaging control device, to execute: an imaging data obtaining step of obtaining imaging data; a frame setting step of setting a predetermined frame on an image in the imaging data obtained by the imaging data obtaining step; a luminance value obtaining step of obtaining luminance values of pixels included in imaging data in a range of the frame set by the frame setting step; a representative value calculating step of calculating a representative value from the luminance values obtained by the luminance value obtaining step; and a converting step of performing gamma conversion of the imaging data obtained by the imaging data obtaining step, wherein the converting step includes: normalizing the imaging data by setting an upper limit value of luminance values on the basis of the representative value calculated by the representative value calculating step; and performing, by means of a hybrid log gamma transfer function, gamma conversion of the imaging data that have been normalized.

DETAILED DESCRIPTION

An embodiment of an imaging control device, an imaging control method, and a program according to the present disclosure is hereinafter described in detail by reference to the appended drawings. The present disclosure is not limited by the following embodiment. An imaging system converts imaging data to a video signal and outputs the video signal, the conversion using an HLG curve according to a representative value related to luminance values in the imaging data. With respect to the following embodiment, a vehicle recording device 10 will be described as an example of the imaging system.

Embodiment

<Configuration of Vehicle Recording Device 10>

Figure 1:
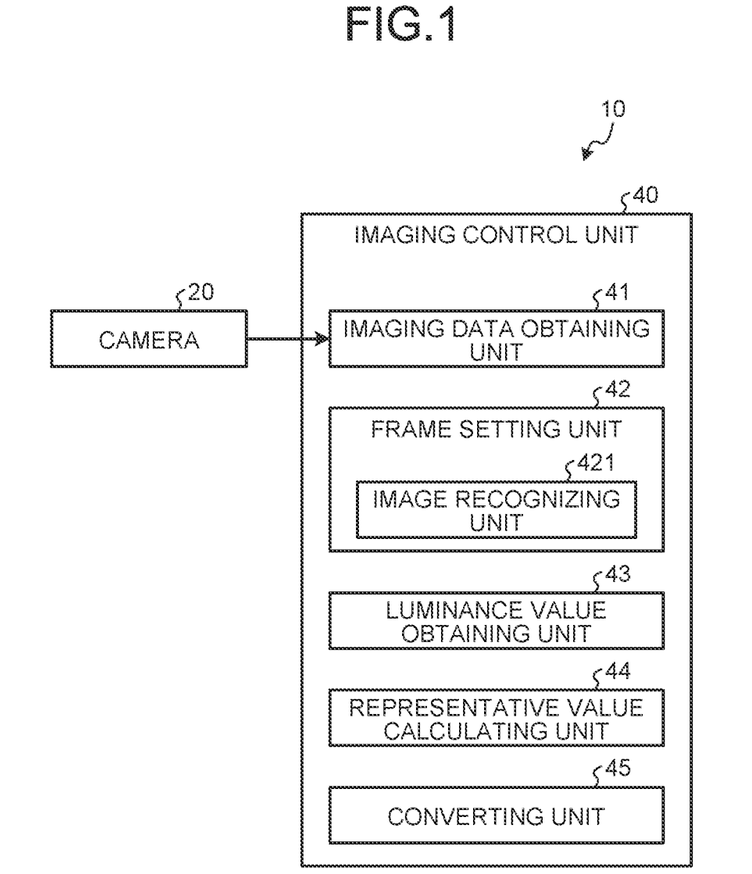
FIG. 1 is a block diagram illustrating an example of a configuration of a vehicle recording device according to an embodiment.

FIG. 1 is a block diagram illustrating an example of a configuration of the vehicle recording device 10 according to the embodiment. The vehicle recording device 10 is, for example, a so-called driving recorder. In addition to being a device that is installed in a vehicle, the vehicle recording device 10 may be a device that is portable and able to be used in a vehicle. The vehicle recording device 10 includes a camera (imaging unit) 20 and an imaging control device 40.

The camera 20 is arranged to capture an image in at least one of a traveling direction of the vehicle or a direction opposite to the traveling direction. With respect to this embodiment, the camera 20 is described as a camera that captures an image in the traveling direction of the vehicle. With respect to this embodiment, the camera 20 is described by use of a single camera oriented in one direction that is a forward direction of the vehicle, but the camera 20 may be a group of plural cameras. The camera 20 is arranged at, for example, a position that is in a front region of the interior of the vehicle and that enables imaging of a region in front of the vehicle. In this embodiment, the camera 20 continually captures a video while an accessory power source of the vehicle is on. The camera 20 outputs imaging data (image data) that have been captured, to an imaging data obtaining unit 41 of the imaging control device 40.

<Configuration of Imaging Control Device 40>

The imaging control device 40 is an arithmetic processing device (control device) formed of, for example, a central processing unit (CPU). The imaging control device 40 loads a stored program into a memory and executes commands included in the program. The imaging control device 40 includes an internal memory not illustrated in the drawings, and the internal memory is used for temporarily storing therein data in the imaging control device 40. The imaging control device 40 includes the imaging data obtaining unit 41, a frame setting unit 42, a luminance value obtaining unit 43, a representative value calculating unit 44, and a converting unit 45.

The imaging data obtaining unit 41 obtains imaging data capturing therein surroundings of the vehicle. More particularly, the imaging data obtaining unit 41 obtains imaging data output by the camera 20. The imaging data are data through which images are output consecutively timewise, the images each being formed of a predetermined number of pixels along horizontal and vertical directions.

The frame setting unit 42 sets a predetermined frame (obtainment range) in the imaging data obtained by the imaging data obtaining unit 41 and capturing therein the surroundings of the vehicle, the predetermined frame being for selecting and extracting some of pixels on an image (screen) so that the predetermined frame is appropriate as a range of obtainment of luminance values. The position, shape, and size of the frame are set so that the frame becomes appropriate as the range of obtainment of the luminance values from the imaging data. More specifically, the frame setting unit 42 sets a frame having predetermined position, shape, and size, on an image forming the imaging data from the camera 20 arranged to capture the image in at least one of the traveling direction of the vehicle or the direction opposite to the traveling direction. In other words, a frame for selection and extraction of some of pixels of an image is provided. The position, shape, and size of the frame are set so that the frame becomes appropriate as the range of obtainment of luminance values from the imaging data. With respect to this embodiment, the frame is described to be in an oblong shape rectangular in horizontal and vertical directions, but without being limited to this oblong shape, the frame may be circular or oval, or may have a combination of any of these shapes. According to the description of this embodiment, one frame is set, but without being limited to one frame, plural frames may be set.

The frame set by the frame setting unit 42 may include a range in which a road surface is captured in the imaging data, the road surface being in at least one of the traveling direction of the vehicle or the direction opposite to the traveling direction. The position, shape, and size of the frame on the image are set to include the range in which the road surface is captured. In this case, the frame setting unit 42 may set the frame in a range including a region lower than a central portion of the imaging data. The range in which the road surface is captured accounts for a predetermined proportion or more of the imaging data, and is suitable as the range where the frame for obtainment of the luminance values is set because road surfaces do not have much change in color.

The frame set by the frame setting unit 42 preferably includes, in addition to the road surface, a range in which a surrounding landscape is captured, the surrounding landscape being, for example, the sky, the sea, or a river. The position, shape, and size of the frame on the image are set to include the surrounding landscape, in addition to the road surface. Including the surrounding landscape will include luminance values of a region other than the road surface. More appropriate luminance values are thereby obtained.

The frame setting unit 42 may have an image recognizing unit 421. The image recognizing unit 421 recognizes imaging data to set the position, shape, and size of the frame. More specifically, the image recognizing unit 421 recognizes, for example, a road surface in at least one of the traveling direction of the vehicle or the direction opposite to the traveling direction, in the imaging data. By performing image processing of the imaging data, the image recognizing unit 421 may recognize, as the road surface, for example, a portion in a region lower than the central portion of the imaging data, the portion being black or gray in color. The image recognizing unit 421 may recognize, as the road surface, a predetermined range on an image in the imaging data, for example, a region lower than the central portion.

By performing image processing of the imaging data, for example, the image recognizing unit 421 may recognize presence or absence of the sun and the position of the sun. In a case where the image recognizing unit 421 performs image processing of the imaging data, and the imaging data are bright overall and has a portion that is in a region above the central portion of the imaging data and that is locally brighter than the surroundings; the image recognizing unit 421 may recognize that portion as the sun. Furthermore, the image recognizing unit 421 may recognize the time of day and weather at the time of imaging from the presence or absence of the sun and position of the sun that have been recognized.

By performing image processing of the imaging data, the image recognizing unit 421 may recognize, for example, a portion illuminated by headlights of the vehicle of its own or another vehicle. In a case where the image recognizing unit 421 performs image processing of the imaging data, the imaging data is dark overall, and there is a portion brighter than the surroundings, the portion being only in a region lower than the central portion of the imaging data; the image recognizing unit 421 may recognize that portion as the portion illuminated by the headlights. In a case where an imaging time saved with the imaging data is night-time and there is a portion brighter than the surroundings, the portion being only in the region lower than the central portion of the imaging data; the image recognizing unit 421 may recognize that portion as the portion illuminated by the headlights.

By performing image processing of the imaging data, for example, the image recognizing unit 421 may recognize the sky. By performing image processing of the imaging data, the image recognizing unit 421 may recognize, as the sky, for example, a portion above the central portion of the imaging data, the portion being blue, white, or gray, in color. The image recognizing unit 421 may recognize, as the sky, a predetermined range in the imaging data, the predetermined range being, for example, above the central portion. Furthermore, on the basis of, for example, information on an imaging time saved with the imaging data, the image recognizing unit 421 may recognize the night-time sky.

By performing image processing of the imaging data, for example, the image recognizing unit 421 may recognize the sea and a river. By performing image processing of the imaging data, the image recognizing unit 421 may recognize, as the sea or a river, for example, a portion lower than the central portion of the imaging data, the portion being blue in color.

By performing image processing of the imaging data, for example, the image recognizing unit 421 may recognize a surrounding landscape, such as a tunnel.

On the basis of a result of recognition by the image recognizing unit 421, the frame setting unit 42 may set a frame having predetermined position, shape and size, on an image of the imaging data.

Figure 2:
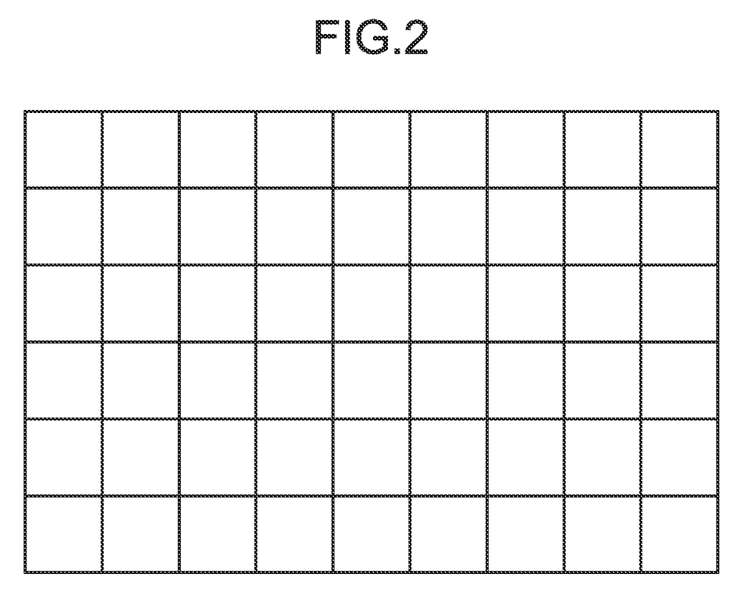
FIG. 2 is an explanatory diagram illustrating a group of cells resulting from lengthwise and crosswise divisions of imaging data, according to the embodiment.

A frame set by a frame setting unit 21 will be described by use of FIG. 2 to FIG. 6. FIG. 2 is an explanatory diagram illustrating a group of cells resulting from lengthwise and crosswise divisions of imaging data, according to the embodiment. As illustrated in FIG. 2, the frame setting unit 42 may set a frame having any position, shape, and size by dividing the imaging data into a group of cells of 6 cells lengthwise by 9 cells crosswise, for example.

Figure 3:
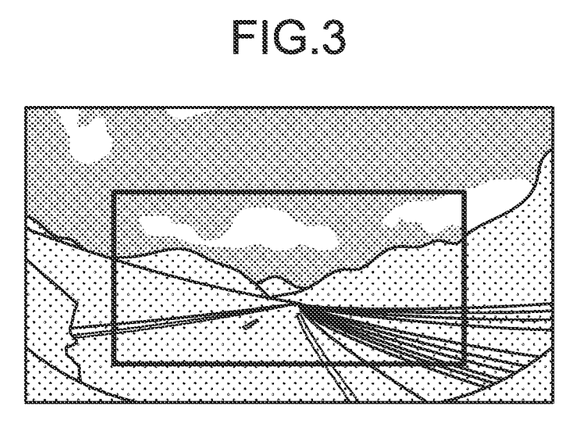
FIG. 3 is an explanatory diagram illustrating an example of a frame set in imaging data at a normal time, according to the embodiment.

FIG. 3 is an explanatory diagram illustrating an example of a frame set in imaging data at a normal time, according to the embodiment. The normal time refers to, for example, the daytime in fine weather. As illustrated in FIG. 3, the frame setting unit 42 sets a frame in a range of the imaging data, the range being lower than a central portion of a screen so that the frame includes a road surface more than anything else. The frame is set in a rectangular shape having a size of, for example, about 50% lengthwise and about 60% crosswise of the imaging data.

Figure 4:
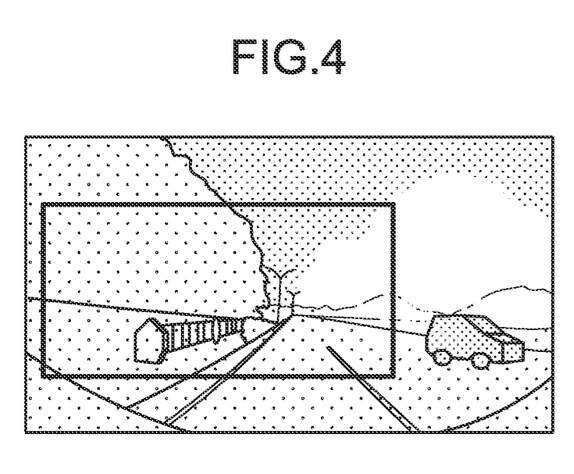
FIG. 4 is an explanatory diagram illustrating an example of a frame set in imaging data in the daytime, according to the embodiment.

FIG. 4 is an explanatory diagram illustrating an example of a frame set in imaging data in the daytime, according to the embodiment. Depending on the time of day, weather, or imaging direction, strong light, such as direct sunlight, may be captured in the daytime and may generate a locally bright portion in the imaging data. Being locally bright corresponds to, for example, pixels having values that are 80% or more of the largest value of luminance (for example, 205 that is 80% of the largest value, 254, for eight bits). On the basis of a result of recognition by the image recognizing unit 421, the frame setting unit 42 sets a position of the frame by avoiding any locally bright portion in the imaging data. In a case where there are any bright pixels in the frame, the frame setting unit 42 moves the position of the frame in a direction opposite to the positions of the bright pixels in the frame. In a case where the imaging data have been divided lengthwise and crosswise into four and there are bright pixels in the upper right, for example, the frame setting unit 42 moves the position of the frame to the bottom left. The frame setting unit 42 may change and set the size of the frame by avoiding the locally bright portion in the imaging data. In a case where the frame setting unit 42 is unable to move the position of the frame by avoiding the bright pixels, the frame setting unit 42 may reduce the size of the frame.

Figure 5:
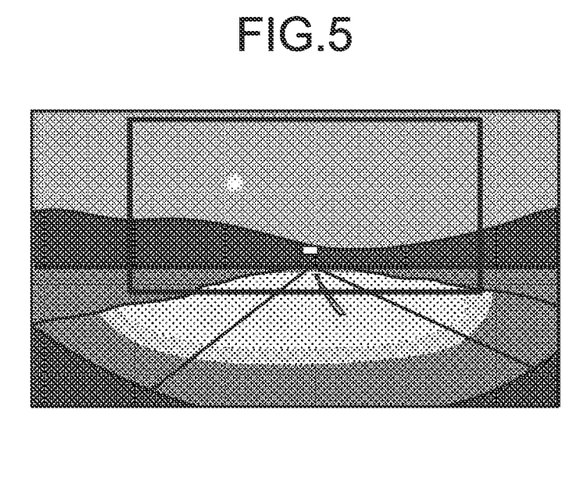
FIG. 5 is an explanatory diagram illustrating an example of a frame set in imaging data in the night-time, according to the embodiment.

FIG. 5 is an explanatory diagram illustrating an example of a frame set in imaging data in the night-time, according to the embodiment. In the night-time, the direction in which a vehicle travels is bright due to headlights of the vehicle and a peripheral dark portion where light from the headlights does not reach becomes dark. In a case where the frame setting unit 42 has set a frame including a range illuminated by the headlights, the peripheral dark portion where the light from the headlights does not reach becomes dark. On the basis of a result of recognition by the image recognizing unit 421, the frame setting unit 42 may set a position of the frame such that the frame includes the peripheral dark portion or a night-time sky portion. On the basis of the result of recognition by the image recognizing unit 421, the frame setting unit 42 may change and set the size the frame such that the frame includes the peripheral dark portion or the night-time sky portion. The imaging data are able to be determined to be of those in the night time by: the imaging time; or the image recognizing unit 421 recognizing whether the headlights are on or off.

Figure 6:
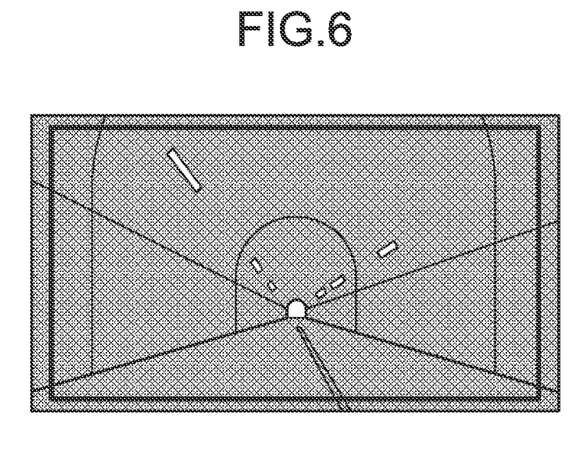
FIG. 6 is an explanatory diagram illustrating an example of a frame set in imaging data that are dark overall, according to the embodiment.

FIG. 6 is an explanatory diagram illustrating an example of a frame set in imaging data that are dark overall, according to the embodiment. In a case where it is dark in whole, like in a tunnel, for example, the size of the frame may be enlarged for obtainment of luminance values from a wider range. The imaging data are able to be determined to be dark overall by: the luminance mean of pixels in the frame; or the number of pixels having luminance values equal to or larger than a predetermined value or equal to or smaller than a predetermined value, for example.

The luminance value obtaining unit 43 obtains luminance values of imaging data in the range of the frame. More specifically, the luminance value obtaining unit 43 obtains a luminance value of each pixel included in the range of the frame.

The representative value calculating unit 44 calculates a representative value from the luminance values obtained by the luminance value obtaining unit 43. For example, the representative value is the median of the luminance values obtained from the imaging data in the range of the frame.

The representative value is not necessarily the median of the luminance values, and may be the mode of the luminance values or any of various averages of the luminance values.

The converting unit 45 performs gamma conversion of the imaging data obtained by the imaging data obtaining unit 41. More specifically, on the basis of the representative value calculated by the representative value calculating unit 44, the converting unit 45 normalizes the imaging data by setting the peak luminance that is the upper limit value of luminance values and performs gamma conversion of the normalized imaging data by means of a hybrid log gamma transfer function according to the peak luminance. The smaller the representative value is, for example, the larger this peak luminance may be set.

In this embodiment, the peak luminance is set in a range of 12 or larger and 48 or smaller. The larger the peak luminance is, the wider the dynamic range of HDR becomes.

Figure 7:
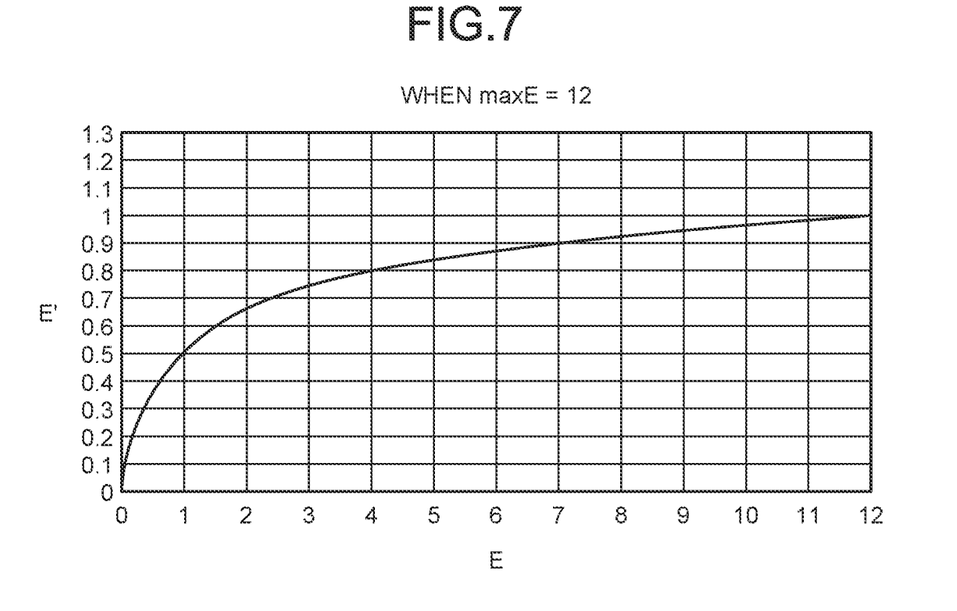
FIG. 7 is a diagram for explanation of an HLG curve in a case where the peak luminance is 12.

HLG curves representing hybrid log gamma transfer functions according to the peak luminance will be described by use of FIG. 7 to FIG. 9. FIG. 7 is a diagram for explanation of an HLG curve in a case where the peak luminance is 12. In FIG. 7, the horizontal axis represents scene luminance E that has been normalized so that the reference white color in SDR has a luminance level of 1, and the vertical axis represents the signal level E' of an electric signal corresponding to the horizontal axis. The hybrid log gamma transfer function has been adjusted so that when white in SDR has reference luminance of 1, the signal for HDR is at 0.5.

Figure 8:
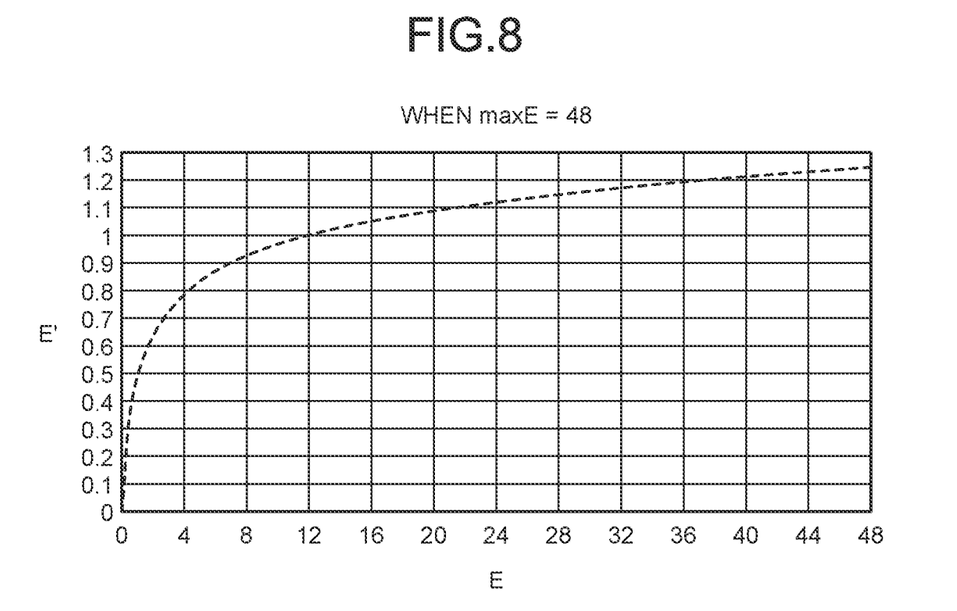
FIG. 8 is a diagram for explanation of an HLG curve in a case where the peak luminance is 48.

FIG. 8 is a diagram for explanation of an HLG curve in a case where the peak luminance is 48. Similarly to FIG. 7, in FIG. 8, the horizontal axis represents scene luminance E that has been normalized so that the reference white color in SDR has a luminance level of 1, and the vertical axis represents the signal level E' of an electric signal corresponding to the horizontal axis.

Figure 9:
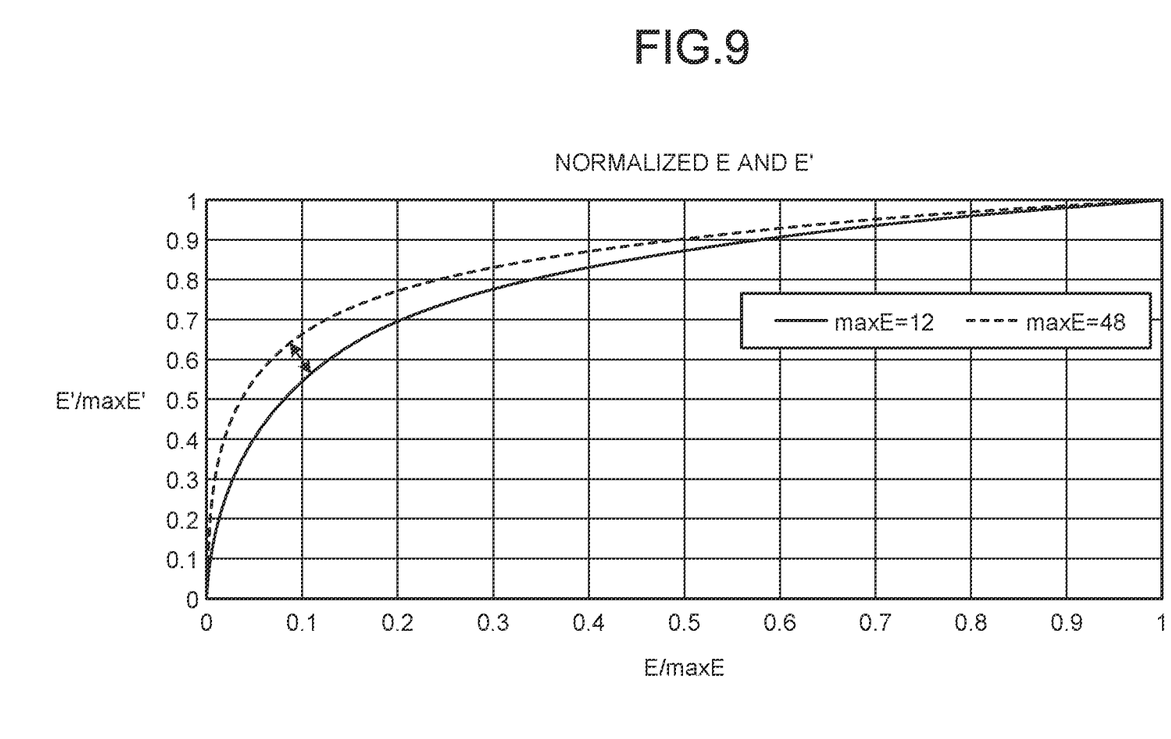
FIG. 9 is a diagram illustrating correlations between normalized scene luminance and normalized electric signal levels.

FIG. 9 is a diagram illustrating correlations between normalized scene luminance E and normalized electric signal levels E'. In FIG. 9, the horizontal axis represents E/maxE and the vertical axis represents E'/maxE'. FIG. 9 illustrates HLG curves that have been normalized in ranges of 0 or larger and 1 or smaller along the horizontal axes and vertical axes of FIG. 7 and FIG. 8. For peak luminance values of 12 or larger and 48 or smaller, HLG curves normalized similarly are obtained, although these HLG curves are not illustrated in FIG. 9. As described above, the HLG curves used in gamma conversion by the converting unit 45 are drawn in curves that differ according to the peak luminance.

By using an HLG curve according to the representative value calculated by the representative value calculating unit 44, the converting unit 45 converts the imaging data into an image signal and outputs the image signal, the HLG curve being one of HLG curves that have been normalized. More specifically, the converting unit 45 converts an image signal that has been normalized, into an image signal, by means of a hybrid log gamma transfer function expressed by Equation 1. Herein, E is scene luminance and has been normalized with a reference white level. Herein, E' is signal level. Herein, γ is signal level corresponding to the reference white level and γ=0.5. Herein, a, b, and c are constants and are defined for each HLG curve. For example, a=0.17883277, b=0.28466892, and c=0.55991073.

$$E' = \begin{cases} r\sqrt{E} & 0 \le E \le 1 \\ a\ln(E-b) + c & 1 < E \end{cases} \quad (1)$$

<Information Processing at Imaging Control Device 40>

Figure 10:
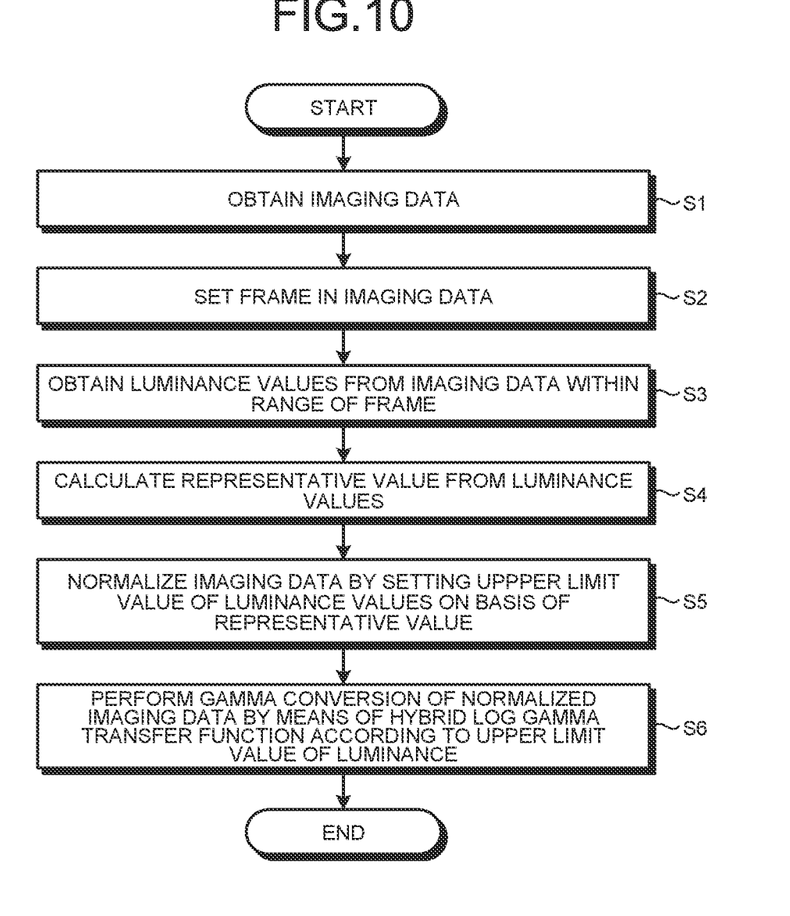
FIG. 10 is a flowchart illustrating a flow of processing at an imaging control device according to the embodiment.

A flow of processing at the imaging control device 40 will be described next by use of FIG. 10. FIG. 10 is a flowchart illustrating the flow of the processing at the imaging control device 40 according to the embodiment. In this embodiment, while the vehicle recording device 10 is in operation, the camera 20 is continually imaging and continually executing the processing illustrated in FIG. 10. The processing illustrated in FIG. 10 may be executed per frame or may be executed every few frames or at predetermined time intervals, for example.

Firstly, the imaging control device 40 obtains, by means of the imaging data obtaining unit 41, imaging data output by the camera 20 (Step S1). The processing by the imaging control device 40 proceeds to Step S2 after Step S1.

After the processing at Step S1, the imaging control device 40 sets, by means of the frame setting unit 42, a predetermined frame in the imaging data (Step S2). The imaging control device 40 sets, by means of the frame setting unit 42, the frame at a predetermined position and having predetermined shape and size, in the imaging data from the camera 20. The position, shape, and size of the frame are set so that the frame becomes appropriate as a range of obtainment of luminance values from the imaging data. The processing by the imaging control device 40 proceeds to Step S3 after Step S2.

After the processing at Step S2, the imaging control device 40 obtains, by means of the luminance value obtaining unit 43, luminance values from imaging data in the range of the frame (Step S3). The processing by the imaging control device 40 proceeds to Step S4 after Step S3.

After the processing at Step S3, the imaging control device 40 calculates, by means of the representative value calculating unit 44, a representative value from the luminance values obtained by the luminance value obtaining unit 43 (Step S4). The imaging control device 40 calculates, by means of the representative value calculating unit 44, as the representative value, the median of the luminance values obtained from the imaging data in the range of the frame, for example. The processing by the imaging control device 40 proceeds to Step S5 after Step S4.

After the processing at Step S4, the imaging control device 40 normalizes, by means of the converting unit 45, the imaging data by setting an upper limit value of luminance, on the basis of the representative value (Step S5). The processing by the imaging control device 40 proceeds to Step S6 after Step S5.

After the processing at Step S5, the imaging control device 40 performs, by means of the converting unit 45, gamma conversion of the normalized imaging data by using a hybrid log gamma transfer function corresponding to the peak luminance set at Step S5, and outputs the converted imaging data (Step S6). The processing by the imaging control device 40 is ended after Step S6.

<Effects>

As described above, in this embodiment, on the basis of a representative value related to luminance values from imaging data, the imaging data are subjected to gamma conversion by use of a hybrid log gamma transfer function according to the peak luminance of the imaging data, and an image signal is output. This embodiment enables conversion of the imaging data by use of the hybrid log gamma transfer function according to the imaging data. The embodiment enables setting of a dynamic range correspondingly to the imaging data. The embodiment enables more minimization of whiteouts in HDR images of the HLG type than in conventional HDR images. The embodiment enables improvement in image quality of output data.

This embodiment enables a frame to be set on the basis of a result of recognition by the image recognizing unit 421, the frame being suitable for each set of imaging data. The embodiment enables more appropriate calculation of a representative value and thus enables improvement in image quality of output data.

In this embodiment, a frame at a predetermined position and having predetermined shape and size is set in any one of sets of imaging data from the camera 20 arranged to capture an image in at least one of a traveling direction of a vehicle or a direction opposite to the traveling direction. This embodiment enables the preferred frame to be set in the imaging data by recognition of the imaging data from the camera 20 arranged to capture the image in at least one of the traveling direction of the vehicle or the direction opposite to the traveling direction.

In this embodiment, a frame set by the frame setting unit 42 includes a road surface in imaging data, the road surface being in at least one of a traveling direction of a vehicle or a direction opposite to the traveling direction. This embodiment enables the frame including the road surface to be set in the imaging data by recognition of the road surface from the imaging data. The embodiment enables output of output data high in image quality and suitable for driving recorders.

In this embodiment, a frame is set by recognition of: presence or absence of the sun and a position of the sun; a portion illuminated by headlights; the sky; the sea and a river; and/or any surrounding landscape. This embodiment enables an appropriate frame to be set according to the imaging data. The embodiment enables output of output data high in image quality according to the imaging data.

[Others]

Each component of the vehicle recording device 10 are functionally and/or conceptually illustrated in the drawings, and is not necessarily configured physically as illustrated in the drawings. That is, the specific form of each device is not limited to the one illustrated in the drawings, and all or part of each device may be functionally or physically separated or integrated in any units according to the processing load on the device and the use situation of the device.

The configuration of the vehicle recording device 10 is implemented as, for example, software, by means of a method that causes the vehicle recording device 10 to operate in the vehicle recording device 10 or a program loaded into a memory and executed by a computer that causes the vehicle recording device 10 to operate. With respect to the embodiment, functional blocks implemented by cooperation of these pieces of hardware or pieces of software have been described above. That is, these functional blocks may be implemented in any of various forms, by hardware only, software only, or a combination of hardware and software.

The above described components include those that are easily anticipated by persons skilled in the art, and those that are substantially the same. Furthermore, any of the above described configurations may be combined as appropriate. In addition, without departing from the gist of the present disclosure, various omissions, substitutions, or modifications of the configurations are possible.

An example where the present disclosure is applied to the imaging system that is the vehicle recording device 10, such as a driving recorder, has been described above, but the present disclosure is not limited to this example. The imaging system is also applicable to, for example, a video camera, a smartphone, or broadcasting equipment.

The imaging control device, the imaging control method, and the program according to the present disclosure are able to be used for, for example, driving recorders, video cameras, smartphones, or broadcasting equipment.

According to the present disclosure, an effect of achieving higher image quality is exerted.

What is claimed is:

1. An imaging control device, comprising:
   an imaging data obtaining unit that obtains imaging data;
   a frame setting unit that sets a frame in which position, shape and size are set so as to become appropriate as a range of obtainment of luminance values in the imaging data obtained by the imaging data obtaining unit;
   a luminance value obtaining unit that obtains luminance values of pixels included in imaging data that are in a range of the frame set by the frame setting unit;
   a representative value calculating unit that calculates a representative value from the luminance values obtained by the luminance value obtaining unit; and
   a converting unit that performs gamma conversion of the imaging data obtained by the imaging data obtaining unit, wherein
   the converting unit normalizes the imaging data by setting an upper limit value of luminance values on the basis of the representative value calculated by the representative value calculating unit and performs, by means of a hybrid log gamma transfer function according to the upper limit value of luminance values, the gamma conversion of the imaging data that have been normalized.

2. The imaging control device according to claim 1, wherein the frame is set to include a range in the imaging data, the range being where a road surface in at least one of a traveling direction of a vehicle or a direction opposite to the traveling direction is captured.

3. The imaging control device according to claim 2, wherein the frame setting unit further includes an image recognizing unit, and the frame is set to not include a range illuminated by headlights of the vehicle or another vehicle, on the basis of a result of recognition by the image recognizing unit.

4. An imaging control method, including:
   an imaging data obtaining step of obtaining imaging data;
   a frame setting step of setting a frame in which position, shape and size are set so as to become appropriate as a range of obtainment of luminance values in the imaging data obtained by the imaging data obtaining step;
   a luminance value obtaining step of obtaining luminance values of pixels included in imaging data in a range of the frame set by the frame setting step;
   a representative value calculating step of calculating a representative value from the luminance values obtained by the luminance value obtaining step; and
   a converting step of performing gamma conversion of the imaging data obtained by the imaging data obtaining step, wherein
   the converting step includes: normalizing the imaging data by setting an upper limit value of luminance values on the basis of the representative value calculated by the representative value calculating step; and performing, by means of a hybrid log gamma transfer function, gamma conversion of the imaging data that have been normalized.

5. A non-transitory computer readable recording medium storing therein a program that causes a computer, which operates as an imaging control device, to execute:
   an imaging data obtaining step of obtaining imaging data;

a frame setting step of setting a frame in which position, shape and size are set so as to become appropriate as a range of obtainment of luminance values in the imaging data obtained by the imaging data obtaining step;

a luminance value obtaining step of obtaining luminance values of pixels included in imaging data in a range of the frame set by the frame setting step;

a representative value calculating step of calculating a representative value from the luminance values obtained by the luminance value obtaining step; and a converting step of performing gamma conversion of the imaging data obtained by the imaging data obtaining step, wherein the converting step includes: normalizing the imaging data by setting an upper limit value of luminance values on the basis of the representative value calculated by the representative value calculating step; and performing, by means of a hybrid log gamma transfer function, gamma conversion of the imaging data that have been normalized.

\* \* \* \* \*